United States Patent
Skurko

[11] Patent Number: 6,082,641
[45] Date of Patent: *Jul. 4, 2000

[54] DROSS PROCESSING

[76] Inventor: Richard Skurko, 21862 Cromwell Ave., Fairview Park, Ohio 44126

[ * ] Notice: This patent issued on a continued prosecution application filed under 37 CFR 1.53(d), and is subject to the twenty year patent term provisions of 35 U.S.C. 154(a)(2).

[21] Appl. No.: 09/057,086

[22] Filed: Apr. 8, 1998

[51] Int. Cl.⁷ .................................................. B02C 23/12
[52] U.S. Cl. .................................... 241/24.13; 241/24.15; 241/80; 241/97
[58] Field of Search ........................... 241/24.13, 24.14, 241/24.15, 80, 97

[56] References Cited

U.S. PATENT DOCUMENTS

| 3,037,711 | 6/1962 | Businger | 241/24 |
|---|---|---|---|
| 3,322,529 | 5/1967 | Pollock | 75/5 |
| 3,905,556 | 9/1975 | Drage | 241/24 |
| 3,999,980 | 12/1976 | Montagna | 75/68 R |
| 4,073,644 | 2/1978 | Papafingos et al. | 75/68 R |
| 4,126,673 | 11/1978 | Cromwell | 241/14 |
| 4,190,422 | 2/1980 | Hitzrot, Jr. | 51/309 |
| 4,418,892 | 12/1983 | Howell | 266/137 |
| 5,290,535 | 3/1994 | Zuck et al. | 423/627 |
| 5,405,427 | 4/1995 | Eckert | 75/308 |
| 5,407,459 | 4/1995 | Breault et al. | 75/303 |
| 5,470,376 | 11/1995 | Dube et al. | 75/672 |
| 5,599,379 | 2/1997 | Spoel et al. | 75/378 |

FOREIGN PATENT DOCUMENTS 1456635  11/1976  United Kingdom .

Primary Examiner—Joseph J. Hail, III
Assistant Examiner—William Hong
Attorney, Agent, or Firm—Pearne, Gordon, McCoy & Granger LLP

[57] ABSTRACT

Apparatus and method for concentrating metallic aluminum from dross comprising a system in which dross is repeatedly and continuously passed through an impact type mill to mill the material and to enable the metallic aluminum concentrates to be separated from the non-metallic components of the dross. A portion of the milled material is continuously diverted by a percent divider to a screening zone where it is classified according to particle size. Through-put devices regulate the average number of passes that material is circulated through the mill in accordance with particle size to obtain a product of relatively high aluminum concentration and a by-product of a relatively low aluminum content.

8 Claims, 2 Drawing Sheets

DROSS PROCESSING

BACKGROUND OF THE INVENTION

The invention relates to a process and apparatus for concentrating metal in a product derived from dross.

PRIOR ART

Various techniques have evolved to recover metallic aluminum from the residues generated in the melting of aluminum. These residues are commonly referred to as skimmings, dross or salt cake depending upon the aluminum content of the residue as well as the type of furnace used in their generation. The term dross as used herein is meant to include any residue from an aluminum melting operation whether it be called a "dross", a "skimming" or a "salt cake" or residue, as well as their concentrates produced by prior milling or crushing. These techniques have included mechanically processing the dross in wet mills, ball mills, rolling mills, hammer mills, and the like to concentrate the metallic aluminum in the milled product and separate the non-metallics into a by-product. This technique has been limited in its effectiveness for separating a high percentage of metallic aluminum from the non-metallics. It will be understood that the "milled product" or "concentrate" as the terms are used herein, has a high metallic content as compared to the original dross but also contains, primarily, salts and oxides. Additional techniques commonly in use today, is to melt dross with the addition of large amounts of salt in a rotary furnace. This technique can achieve relatively high recovery of aluminum, but produces large volumes of salt cake by-product that goes to a landfill and, consequently, is harmful to the environment. U.S. Pat. No. 3,037,711 to Businger discloses a system for recovering metallic aluminum from dross that employs an impact-type mill and other apparatus to mechanically separate the metallic aluminum from the non-metallics of the dross.

SUMMARY OF THE INVENTION

The invention provides a mechanical process for concentrating metallic aluminum from dross. The process is both efficient and effective in yielding a product that is relatively high in metallic aluminum concentration as well as a by-product with a relatively low percentage of aluminum. The preferred process uses an impact-type mill to free metallic aluminum particles from the non-metallic components of dross. In accordance with the invention, the process can be a continuous operation in which dross is recirculated through an impact mill for numerous passes and is eventually screened to separate the metallic aluminum concentrate from the by-product. It has been found that the disclosed process is capable of generating a reclaimed aluminum product that is 85% or more pure.

More specifically, the process utilizes a series of screens and associated metering through-put devices that receive a small diverted portion of the stream of material circulating through the mill. The screens separate particles of the diverted material according to size and the metering through-put devices regulate the average number of passes particles of a particular size make through the mill. The number of passes, according to the invention is related to the particle size of the material. In general, the smaller the particle size, the more passes are required to concentrate the product to a relatively high percentage of aluminum. The metering through-put devices are adjusted to produce the appropriate average number of passes through the mill. Typically, the non-metallic material is eventually milled into dust and is drawn off the mill and screen areas by a vacuum to a bag house where it is collected as a by-product of the process.

For large size dross fractions, e.g. chunks of a size between about 2" and 1", the process can involve the technique of continuous milling a circulating load through an impact mill while separating a small percentage of the flow from the main flow as finished product ready for screening and thereby regulating the number of passes, on average, the material makes through the mill. For example, the percent can be about 3 so that the number of passes will average about 32.

By controlling the rotor speed of the impact mill in conjunction with the number of passes and the percent divider setting, the process can be optimized.

It will be understood, according to the invention, by maintaining the mill operating continuously at full capacity with multiple passes, relatively small conveyors, screens, as well as a relatively small mill can be used.

The invention obtains relatively high aluminum concentration in the product so that less salt flux is required in a subsequent melting process and, consequently, less salt block is generated. Additionally, the invention provides a higher overall recovery of aluminum than other known processes.

While the preferred embodiment relates to aluminum dross, it is believed that the invention has application to other metal drosses such as zinc dross.

DESCRIPTION OF THE PREFERRED EMBODIMENT

Figure 1:
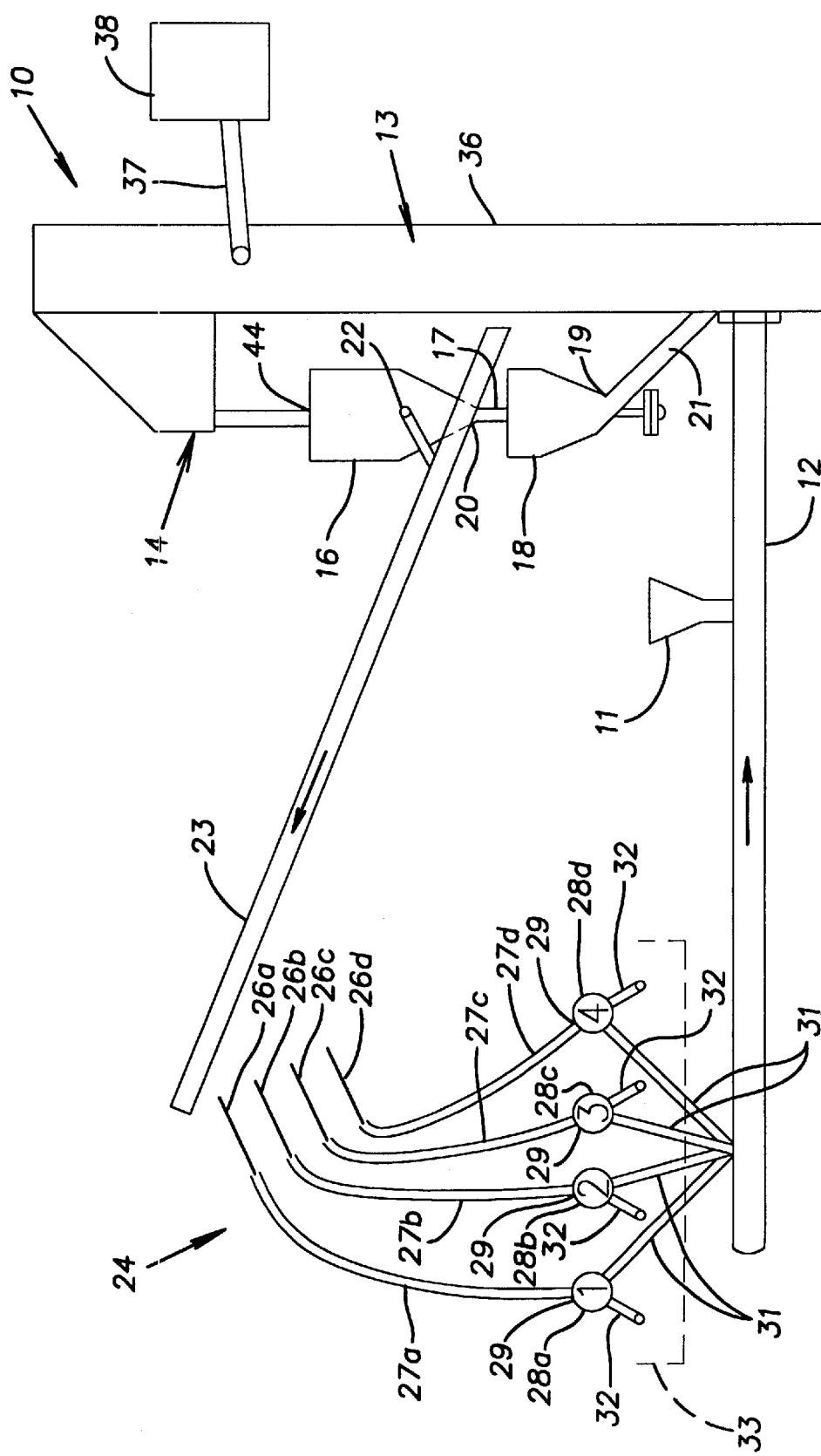
FIG. 1 is a schematic representation of apparatus used to practice the invention to mechanically reclaim metallic aluminum from dross.

Referring now to FIG. 1, apparatus 10 operates to mechanically process aluminum dross to separate metallic aluminum from its non-metallic parts. A supply or feed of dross is introduced into the apparatus 10 at a receiving or input hopper 11. The dross from the input hopper is carried by a conveyor 12 to a bucket elevator 13 that raises the dross up to a zone 14 where, carried by gravity, it can enter the inlet of a percent divider 16. A majority of the material entering the percent divider 16, as discussed more fully below, falls by gravity from the main outlet 20 into the inlet 17 of a mill 18 of the impact type in which a rotor impels particles against a stationary target or anvil. The mill 18, in a continuous operation, mills the material and then discharges it from a port 19 into a chute 21 in turn transporting it to the "return" bucket elevator 13. A minor portion of the material entering the percent divider 16 is diverted from the main material stream through an auxiliary outlet 22 of the percent divider. Material passing through the auxiliary outlet 22 is conveyed by a conveyor 23, which in the illustrated case is a screw conveyor, to a screening zone 24.

A series of screens 26a, 26b, 26c and 26d receive the divided or diverted material carried by the screw conveyor 23 from the percent divider 16. The screens 26a–26d are arranged one over the other in a conventional manner, with the mesh of each successive underlying screen being finer than the screen above it. An upper screen 26a can have a mesh of, for example, 18 Std. U.S., and the lower screen 26d can have a mesh of, for example, 140 Std. U.S. In the illustrated case, four screens are used, but this number can be increased or decreased and the mesh sizes can be suitably varied.

Particulate material that is too large to pass through a particular screen is vibrated or otherwise carried off the top of the screen and directed by an associated chute or guide 27a, 27b, 27c or 27d to an associated metering or through-put device 28a, 28b, 28c and 28d. Each of the through-put devices 28 has two discharges 31 and 32. One of the discharges 31 is connected to a common inlet of the screw conveyor 12. The other through-put device discharge 32 is connected to a suitable product recovery device which can be a simple, common bin 33 serving all of the discharges 32 or more elaborate structure and apparatus such as a conveyor or conveyors.

Each through-put device 28 meters the relative flow between its discharges 31, 32. A through-put device 28 can, for example, take the form of a simple screw feed conveyor arranged so that material carried by its screw passes through one discharge 31 and any excess material received at the through-put inlet, designated 29, but exceeding the volume rate capacity of its screw passes through the other discharge 32. The screw or like element of the through-put device is driven, for example, by a variable speed electric motor or other variable speed driver so that the volume rate capacity of the screw or metering element is adjustable.

Figure 2:
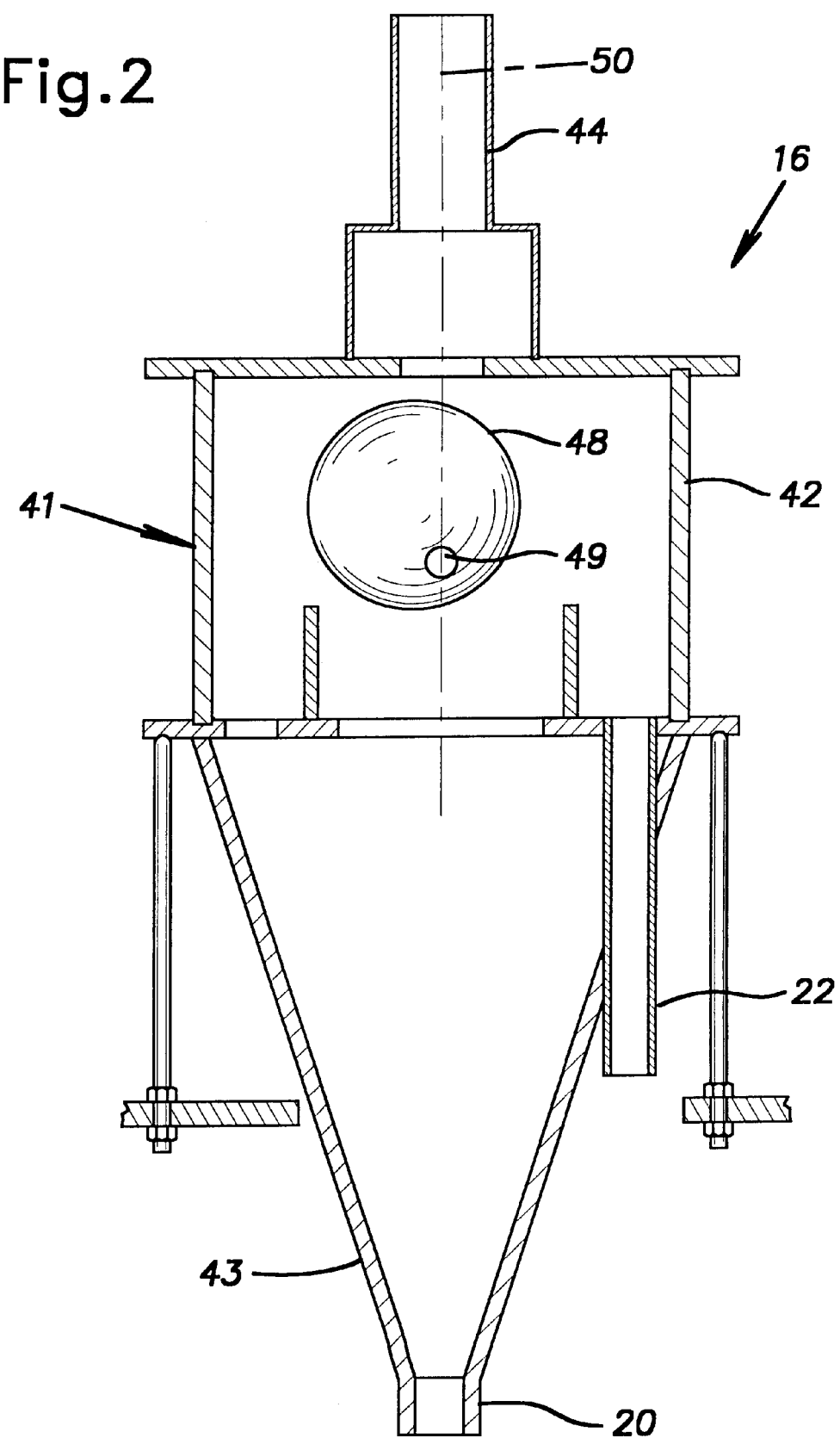
FIG. 2 is a schematic cross-sectional view of a separator for dividing the material flowing through a mill into two streams, a main stream for delivery to the mill and a secondary stream for delivery to the screen and through-put devices.

The bucket elevator or conveyor 13 is enclosed with a housing 36 and the interior of the housing is connected with a vacuum line 37 to a bag house diagrammatically indicated at 38 in which airborne dust from the housing is collected. The environment of the screens 26a–26d ideally is enclosed with a similar housing which likewise is connected by a vacuum line to the bag house 38 again to collect airborne particulate matter or dust. The percent divider 16, illustrated somewhat diagrammatically in FIG. 2, comprises a circular enclosure 41 having an upper cylindrical portion 42 and a lower conical portion 43. The divider 16 has an inlet 44 at its top and two outlets, the main outlet 20, being its major one, at its bottom and the minor one 22 adjacent its mid-elevation. In the enclosure or housing 41 directly below the inlet 44 is a primary flow divider in the form of a solid sphere 48. The sphere. 48 is eccentrically mounted on a shaft 49 below its center. The mounting is such that by pivoting the shaft 49 the sphere 48 is positioned off an axis 50 of the inlet 44. By varying the offset of the sphere 48 from this axis 50, a stream of material entering the housing 41 through the inlet 44 can be adjustably divided to flow through the main outlet 20 and the diverted flow or secondary outlet 22. If the sphere 48 is rocked away from the secondary outlet 22, the flow through the secondary outlet 22 is increased and the flow through the main outlet 20 is decreased. When the sphere 48 is tilted towards the secondary outlet 22 the opposite effect occurs. The shaft 49 is adjusted to a position corresponding to a desired ratio of flow between the main outlet 20 and minor outlet 22.

The mill 18 is preferably an impact-type unit having a rotor or impeller that throws material against a stationary anvil surface to fracture particulate matter into smaller particles. This type of mill has been found to be especially effective in practicing the present invention for reclaiming metallic aluminum from aluminum dross.

It has been found that to achieve high recovery of metallic aluminum, dross material should be repeatedly run through the mill 18 and impacted against the anvil. Moreover, in accordance with the invention to achieve a high concentration the number of passes of material through the mill 18 should vary in relation to the particle size of the material being processed. In general, it has been found that, surprisingly, the larger the particle size the fewer passes through the mill 18 are required. Smaller size particles require a greater number of passes through the mill to achieve a high recovery of metallic aluminum.

In operation, dross is milled or crushed in the impact mill 18. The conveyor or elevator 13 recirculates this milled material for additional passes through the mill 18. A small percentage of the material passing through the conveyor 13 is diverted by the percent divider or diverter 16. This percent may typically be in the range of 4 to 5%, for example. The diverted material is carried to the screens 26a–26d where it is classified according to particle size.

A certain part of the flow off the top of each screen, determined by experimentation, is returned to the mill 18 via the associated through-put device 28 and the conveyor 12. The residual part of the flow off the top of a screen is finished product discharged by the through-put device 28 through the discharge 32. Each of the through-put devices 28, which governs the ratio of its returned material flow and its product flow through its respective discharges 31, 32, has its metering speed adjusted so that for the particular size of the material it is handling the material is circulated, on average, a desired number of passes through the mill 18 before it eventually is sent through the final discharge 32. By way of example, the respective through-put devices 28 are adjusted so that on average, the material off the first screen is sent through the mill 18 for about 20 to 30 times, while the material off the fourth screen is sent through the mill about 80 to 150 times as determined by experimentation. The material off of the intermediate screens is sent through the mill a proportionately greater number of times than the first screen and fewer times than the fourth screen. The material passing through the last screen can be collected by vacuum into the bag house 38 or can be otherwise collected, used or discarded. The conveyor 12, which in the illustrated case is a screw conveyor, automatically adds a volume of new dross material from the input hopper or supply 11 equal to the volume of material generated as product and the volume drawn by the vacuum to the bag house throughout the system and the volume through the last screen whether it is drawn off by vacuum or is otherwise continuously or periodically removed. It will be understood that, for the most part, the non-metallic component of the dross is converted by the mill 18 to dust, i.e. to a particle size where it can be airborne and drawn off at appropriate locations in the system by a vacuum induced air flow to the bag house 38.

Excellent recovery of aluminum can be obtained from large chunks of dross by subjecting this material to the same number of passes through the impact mill. In this case, the percent divider 16 can be set to divert a certain percent of material out of the stream of the circulating load going through the mill 18 and simply channel this material for screening as finished product. By way of example, the percent divider 16, in this dross processing mode can be set to divert about 3% to produce an average of about 32 passes through the mill. Concentrations as high as 85% aluminum content have been produced by this technique.

It should be evident that this disclosure is by way of example and that various changes may be made by adding, modifying or eliminating details without departing from the fair scope of the teaching contained in this disclosure. For example, the input hopper 11 and screw conveyor 12 and bucket elevator 13 can be replaced or augmented by a belt weighing system and belt conveyors where the dross particles are difficult to handle in a screw conveyor and bucket elevator. The invention is therefore not limited to particular details of this disclosure except to the extent that the following claims are necessarily so limited.

What is claimed is:

1. A method of recovering metallic concentrates from dross, comprising recirculating a stream of dross material continuously through a mill to mill it, diverting a predetermined small percentage, substantially by volume and not size, of substantially the whole material passing through the stream and drawing off airborne particulate matter as non-metallic by-product, the diverted material being recovered as product, and adding material to replace that which is diverted as product and drawn off as airborne particulate matter.

2. A method as set forth in claim 1, including using an impact-type mill for processing said dross.

3. A method as set forth in claim 1, including screening the diverted flow to classify the particle size of the material in such flow.

4. A method as set forth in claim 3, including reintroducing part of the screened material to the recirculating stream to the mill.

5. A method as set forth in claim 4, including directing the diverted material to a series of screens of increasing mesh number and the fraction of material coming off the top of each screen is sub-divided with one sub-stream being returned to the recirculating stream to the mill and the other sub-stream being delivered as recovered product, the proportion of the amount of returned material to the amount of delivered product for the fraction coming off the top of each screen being adjusted such that the material coming off the top of the coarser screens on average is subjected to fewer passes through the mill than the material coming off the top of the finer screens on average.

6. A method as set forth in claim 5, including operating the mill with impact energy to mill dross material.

7. A method of recovering metallic aluminum from dross which comprises milling the dross, screening the particles of milled dross through a series of screens ranging from relatively coarse to relatively fine and remilling the screened dross particles for an average number of times related to the screen size classification of the milled dross particles, the average number of remilling passes being regulated differently for different screen sizes by dividing each class of particle size into two parts by volume, substantially independent of size, with a throughput device and remilling one Dart while diverting the other part for use as recovered material, the volume ratio of one part to the other part for each class of particle size being a selected value and being different among classes.

8. A method a set forth in claim 7, including primarily separating non-metallic constituents from the mill and screens as airborne dust by a vacuum circuit to a bag house.

* * * * *